Patented Aug. 5, 1952

2,606,201

UNITED STATES PATENT OFFICE 2,606,201

LOWER ALKYL ESTERS OF O-CARBOXY-PHENYLTHIOANTIMONY DICHLORIDE

Paul F. Wiley, Indianapolis, Ind., assignor to Eli Lilly and Company, Indianapolis, Ind., a corporation of Indiana No Drawing. Application June 29, 1950,
Serial No. 171,234

5 Claims. (Cl. 260—446)

This invention relates to trivalent organic derivatives of antimony, and more particularly to o-carboxyphenylthioantimony dichloride esters.

Antimony derivatives of organic compounds are well known to the art and have been used in treating diseases caused by parasites, such as filariasis and schistosomiasis. However, it has been necessary to administer such organic antimonials parenterally, because when oral administration has been attempted they were poorly absorbed from the gastrointestinal tract, and were toxic, and caused untoward side effects such as irritation of the gastric mucosa, nausea and the like.

It is an object of this invention to provide trivalent organic derivatives of antimony which are therapeutically effective when administered orally. It is a further object of this invention to provide organic antimonial compounds of low oral toxicity.

In accordance with the above and other objects of this invention, it has been found that o-carboxyphenylthioantimony dichloride esters are highly effective against protozoan parasites such as Schistosoma mansoni when administered orally, and possess a relatively low toxicity when so administered.

The novel compounds of the present invention are lower alkyl esters of an antimony-containing acid represented by the following formula

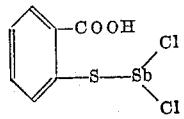

The o-carboxyphenylthioantimony dichloride esters are yellow, crystalline solids which are only slightly soluble in and are decomposed by water. They are readily prepared by heating together antimony trichloride and a thiosalicylic acid ester, in an inert organic solvent.

The following example showing the preparation of o-carbomethoxyphenylthioantimony dichloride illustrates the preparation of the novel antimony compounds.

A mixture of 8.4 g. (0.05 mol) of methyl thiosalicylate, 11.4 g. (0.05 mol) of antimony trichloride and 200 cc. of anhydrous carbon tetrachloride is refluxed for 16 hours. During the refluxing, the insoluble antimony trichloride dissolves and gaseous hydrogen chloride is evolved, and after several hours crystals of o-carbomethoxyphenylthioantimony dichloride, formed in the reaction, begin to precipitate. On completion of the period of refluxing, the reaction mixture is cooled to about 10° C. and the yellow, crystalline precipitate is filtered off, dried, and recrystallized from carbon tetrachloride.

o-Carbomethoxyphenylthioantimony dichloride thus prepared melted at about 131–133° C. Analysis showed the presence of 26.68 percent of carbon, 2.07 percent of hydrogen, 8.57 percent of sulfur and 33.20 percent of antimony, as compared with the calculated amounts of 26.69 percent of carbon, 1.96 percent of hydrogen, 8.90 percent of sulfur and 33.83 percent of antimony.

Other esters of o-carboxyphenylthioantimony dichloride are prepared in exactly the same manner, using the appropriate ester of thiosalicylic acid. Thus with ethyl thiosalicylate, o-carbethoxyphenylthioantimony dichloride is obtained; with propyl thiosalicylate, o-carbopropoxyphenylthioantimony dichloride is obtained; and with butyl thiosalicylate, o-carbobutoxyphenylthioantimony dichloride is obtained. These antimony compounds have physical, chemical and therapeutic properties comparable to those of o-carbomethoxyphenylthioantimony dichloride.

I claim:

1. Lower alkyl esters of o-carboxyphenylthioantimony dichloride represented by the formula

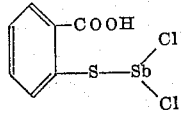

2. o-Carbomethyoxyphenylthioantimony dichloride.
3. o-Carbopropoxyphenylthioantimony dichloride.
4. o-Carboethoxyphenylthioantimony dichloride.
5. o-Carbobutoxyphenylthioantimony dichloride.

PAUL F. WILEY.

REFERENCES CITED

The following references are of record in the file of this patent:

Klement et al.: Berichte, Deutsche Chemische Gesellschaft, vol. 71 (1938), pages 890–894.

C. A., vol. 3, page 2491.